United States Patent [19]
Chimura et al.

[11] 3,867,478
[45] Feb. 18, 1975

[54] POLYESTER COMPOSITION

[75] Inventors: Kazuya Chimura; Hiroshi Iwata; Yasuo Nakamura; Mitsuaki Shiotsuki, all of Ohtake, Japan

[73] Assignee: Mitsubishi Rayon Co., Ltd., Tokyo, Japan

[22] Filed: Feb. 22, 1973

[21] Appl. No.: 334,709

[30] Foreign Application Priority Data
Feb. 22, 1972 Japan.............................. 47-18353

[52] U.S. Cl......... 260/857 PG, 260/40 P, 260/75 P, 260/78 S, 260/857 PE, 260/DIG. 16
[51] Int. Cl............................................ C08g 41/04
[58] Field of Search................ 260/857 PG, 857 PE

[56] References Cited
UNITED STATES PATENTS
| | | | |
|---|---|---|---|
| 3,544,658 | 12/1970 | East................................ | 260/857 PE |
| 3,636,135 | 1/1972 | Garforth........................ | 260/857 PG |

FOREIGN PATENTS OR APPLICATIONS
| | | | |
|---|---|---|---|
| 1,070,613 | 6/1967 | Great Britain................ | 260/857 PE |
| 46-15027 | 4/1971 | Japan............................ | 260/857 PE |
| 46-15028 | 4/1971 | Japan............................ | 260/857 PE |

*Primary Examiner*—Paul Lieberman
*Attorney, Agent, or Firm*—Armstrong, Nikaido & Wegner

[57] ABSTRACT

Polyester fibers having excellent and uniform dyeability with acid dyes and good whiteness, and good fastness to light and washing on dyed article, and good other fiber properties can be obtained from a polyester composition which comprises 70 to 97.5 % by weight of a linear polyester, 2 to 20 % by weight of a polyamide containing 1 to 10 % by weight of nitrogen atom of tertiary amino group in the molecule, and 0.5 to 10 % by weight of a compound (I) of the general formula:

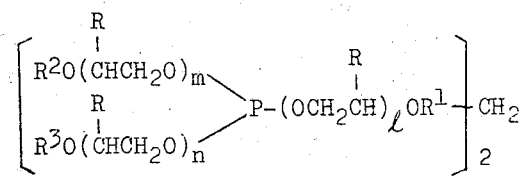

(wherein R is hydrogen or methyl, $R^1$ is phenylene having or not having hydrocarbon radical substituents, $R^2$ and $R^3$ are at least one group selected from aryl and aralkyl groups having or not having a substituent and an alkyl group of $C_1$ to $C_{18}$ and l, m and n are integers of 1 to 200).

18 Claims, No Drawings

POLYESTER COMPOSITION

This invention relates to a polyester composition having an excellent dyeability with acid dyes.

Polyesters, especially polyethylene terephthalate have excellent chemical and physical properties and have been widely used for films, resins and fibers. Particularly, polyester fibers have a high crystallinity and a high melting point and have excellent fiber properties in chemical stability, heat stability, light stability, strength, etc.

However, apart from these good properties, polyester fibers have the defect of low dyeability. That is, due to the fact that they possess no dye sites for ionic dyes such as acid dyes and basic dyes in their constructive components and that they have compact fiber structures, they can be dyed only with dispersed dyes.

Various methods have been proposed for dyeing polyester fibers with basic dyes and acid dyes. Among them, as a method for modifying polyesters to make them dyeable with acid dyes, it has been propsed to copolymerize polyesters with a compound having a basic functional groups at polymerization step. According to this method, however, the polyesters produced are colored and melting point thereof are remarkably reduced. As an alternative method, it has been proposed to blend materials having basic functional groups such as polyamides with polyesters. According to this method, when usual polyamides such as Nylon 6 and Nylon 66 are blended, a large amount of such polyamides are required to secure sufficient terminal amino groups which are dye sites for acid dyes for practical dyeability and as the result, preferred properties peculiar to polyester fibers are markedly lowered.

To overcome there defects, an attempt to introduce tertiary amino groups into polyamide structural components to increase amount of dye sites thereby to reduce amount of polyamide which are incorporated into polyester has been made. See, for example, Dutch Pat. No. 7009442.

However, when such polyamides as having active amino groups in a large amount are added to polyesters, fibers obtained by melt-blending and melt-spinning the two are considerably colored in brown. Not only the whiteness of filaments is reduced, but brightness of the dyed fibers is reduced to lower the commercial value.

Furthermore, by merely adding such polyamides containing increased amount of amino groups to polyesters, it is difficult to allow water soluble acid dyes to pass through the dense polyester layer which is hydrophobic and has crystalline structure and to diffuse to amino groups which are dye sites in the added polyamides. Therefore, sufficient dyeability cannot be obtained without using high pressure dyeing, dyeing under strongly acidic state or carrier dyeing. Under the circumstance, an attempt to blend a highly hydrophilic polyalkylene glycol together with said polyamide has been made. In this respect, see Dutch Pat. No. 6608121.

However, according to this method, whiteness, oxidation stability and weather resistance of the obtained filaments are reduced due to the added polyalkylene glycol and moreover, the added polyalkylene glycol is apt to flow out from fibers while dyeing to cause unlevel dyeing and reduction in fastness to light of dyed fibers.

Furthermore, a method according to which the obtained fibers are heat treated under a certain condition to improve dyeability in case of adding polyamides having tertiary amino groups has also been proposed. See Dutch Patent 7009442. According to this method, dyeability greatly changes due to slight difference of conditions for production of fibers such as temperature at stretching and unlevel dyeing is considerably caused in each pirn and lot.

As the results of various researches for obtaining polyester compositions having good dyeability with acid dyes and having no defects as mentioned above, the inventors have attained the present invention.

That is, the present invention provides a polyester composition which comprises 70 to 97.5 percent by weight of a linear polyester, 2 to 20 percent by weight of a polyamide containing 1 to 10 percent by weight of nitrogen atom of tertiary amino group in the molecule, and 0.5 to 10 percent by weight of a compound (I) of the general formula:

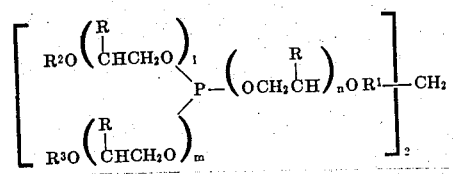

(wherein R is hydrogen or methyl, $R^1$ is phenylene having or not having hydrocarbon radical substituents, $R^2$ and $R_3$ are at least one group selected from aryl and aralkyl groups having or not having a substituent and an alkyl group of $C_1$ to $C_{18}$ and $l$, $m$ and $n$ are integers of 1 to 200).

According to the polyester having the compositions as specified in the present invention, especially polyester fibers, no coloration is caused at melt spinning step, filaments of excellent whiteness can be obtained, practical dyeing concentration can be attained with acid dyes only by such dyeing methods as applied for dyeing of usual nylon fibers or wool fibers without pre-heat treatment, high pressure dyeing or carrier dyeing and dyed fibers of little unlevel dyeing can be obtained. Furthermore, thus obtained dyed articles are excellent in color yield brightness and fastness as well as in weather resistance and oxidation stability.

The term "polyester" referred to in the present invention means polyesters such as polyethylene terephthalate, polytetramethylene terephthalate, poly-1,4-cyclohexane terephthalate, etc. and copolymers thereof with dibasic acids such as isophthalic acid, adipic acid, azelaic acid, etc. or their derivatives or with diethylene glycol. Moreover, the polyesters may additionally contain branching agent such as glycerine, pentaerythritol, trimethylolpropane, trimesic acid, etc.

The polyamides used in the present invention are those produced by reacting at least one compounds selected from polyamines such as N-alkyl substituted triamines represented by the general formula

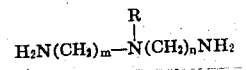

(wherein R is an alky group and $m$ and $n$ are integrers of at least 1), and N-mono- or N,N' diamino alkyl substituted piperazines represented by the general formula

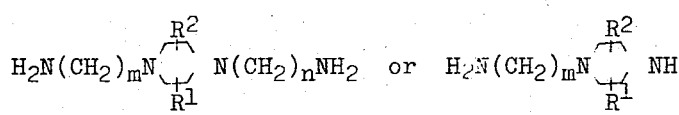

(wherein $R^1$ and $R^2$ are hydrogen or alkly, $m$ and $n$ are as previously defined) as an amine component containing tertiary amine and dicarboxylic acids of piperazines represented by the general formula

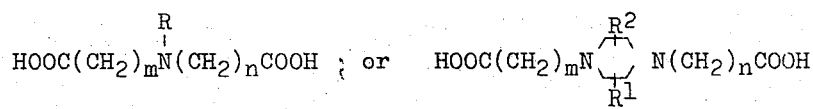

(wherein R, $R^1$, $R^2$, $m$ and $n$ are as previously defined) with other aliphatic dicarboxylic acids, aromatic dicarboxylic acids or aliphatic or aromatic diamines in such a manner that the produced polyamides contain 1 to 10 percent by weight of nitrogen atoms of tertiary amino group.

In this case, it is necessary that the total primary and secondary amines and acid group of the dicarboxylic acids are in equivalent relation in the starting materials charged, but lactams or aminocarboxylic acids may appropriately be copolymerized with the polyamides, provided that nitrogen atom of the tertiary amino group can be maintained within the range of 1 to 10 percent by weight.

Specific examples of the preferred tertiary amine containing compounds having said general formulas are as follows: N,N-bis(3-aminopropyl)methylamine, N,N'-bis(2-aminoethyl)piperazine, N,N'-bis(3-aminopropyl)-piperazine, N-2-aminoethyl piperzine, N,N'-bis(3-aminoethyl)-2-methyl piperazine, N,N'-bis(3-aminopropyl)-2,5-dimethyl piperazine, N,N-bis(2-carboxyethyl)methylamine, N,N'-bis(2-carboxyethyl)piperazine, etc.

Furthermore, preferred examples of other components for producing polyamides are dibasic acids such as adipic acid, sebacic acid, isophthalic acid, terephthalic acid, etc., diamines such as tetramethylenediamine, hexamethylenediamine, metaphenylenediamine, metaxylylenediamine, etc. ε-caprolactam, aminocaproic acid, etc.

Examples of the suitable polyamides prepared from these monomers are as follows:

N-2-aminoethylpiperazine/adipic acid (molar ratio of the starting materials: 50/50 and nitrogen atom of tertiary amino group in the produced polyamides: 5.8 percent by weight), N,N'-bis(3-aminopropyl)piperazine/adipic acid (50/50 and 9.09 percent by weight), N,N-bis(3-aminopropyl)methylamine/sebacic acid (50/50 and 4.50 percent by weight), N,N'-bis(2-carboxyethyl)piperazine/hexamethylenediamine (50/50 and 9.09 percent by weight), N,N'-bis(3-aminopropyl)piperazine/adipic acid/isophthalic acid (50/25/25 and 8.80 percent by weight), N,N-bis(2-aminoethyl)piperazine/hexamethylenediamine/adipic acid (25/25/50 and 5.51 percent by weight), N-2-aminoethylpiperazine/terephthalic acid/ε-caprolactam (20/20/60 and 2.54 percent by weight), etc.

Suitable examples of compounds (I) are as follows:

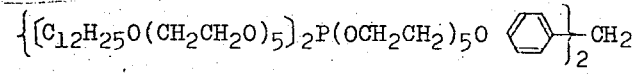

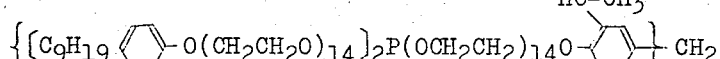
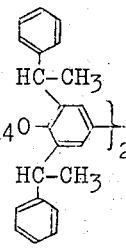

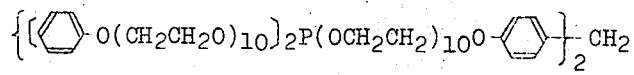

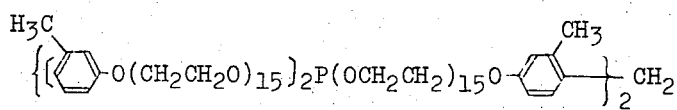

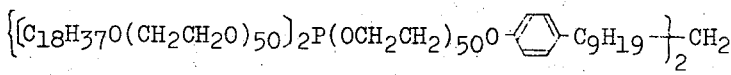

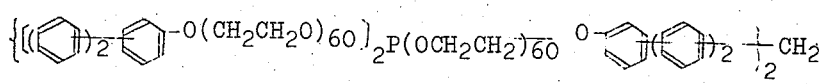

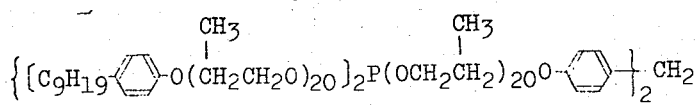

There are several methods for the synthesis of these compounds.

As one of said methods there is a method wherein a condensation reaction is effected between a phosphorous acid triester of ω-alkyl or aryl polyalkyleneglycol and formaldehyde. This reaction can easily be conducted in the same manner as that between a phenolic compound and formaldehyde. When a phosphorous acid triester of ω-alkyl or arylpolyalkylene glycol is used in said reaction, the reaction should preferably be carried out in an organic solvent or in the absence of a solvent since said phosphorous acid triester is slightly hydrolyzable with water but is not so hydrolyzable as a low molecular weight phosphorous acid triester. In this reaction paraformaldehyde and trioxane may also be used as a source of formaldehyde. The compound (I) according to this invention are synthesized by reacting phosphorous acid triester of ω-alkyl or arylpolyalkylene glycol with formaldehyde in a molar ratio of 2:1, but other molar ratios slightly different from the former may practically be used.

In general, phosphorous acid triesters are often synthesized by reacting an alcohol corresponding to the ester group with phosphorous trichloride to remove hydrochloric acid produced or esterinterchange reaction of the alcohol with triphenyl phosphite to remove phenol produced.

As another of said methods, thus, there is also a method wherein triphenyl phosphite is reacted with 2 mol. of ω-alkyl or aryl-polyalkylene glycol and ½ mol. of a compound obtained by reacting an alkylene oxide with a methylene bisphenol derivative previously made by condensing a phenolic compound with formaldehyde in a molar ratio of 2:1.

Whiteness of the shaped products can be further improved by blending 0.05 to 2.0 percent by weight of the total composition of phosphorus compounds represented by the general formula

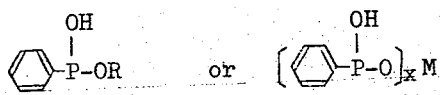

(wherein R is hydrogen, an alkyl, cycloalkyl, aryl or alkylaryl group, M is a metal atom and $x$ is an integer corresponding to valency of M) in the composition of the present invention.

Suitable examples of phosphorus compounds represented by said general formulas are as follows:

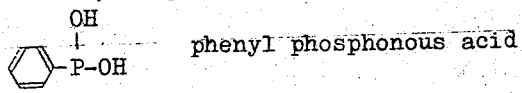 phenyl phosphonous acid

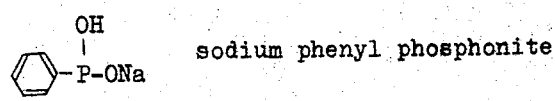 sodium phenyl phosphonite

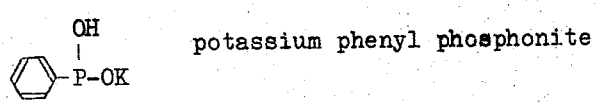 potassium phenyl phosphonite

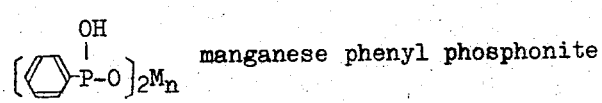 manganese phenyl phosphonite

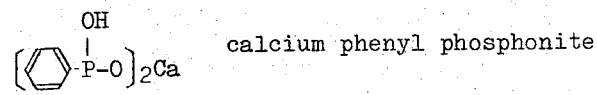 calcium phenyl phosphonite

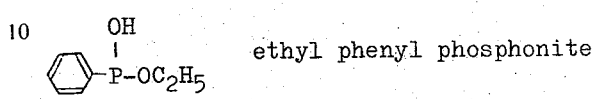 ethyl phenyl phosphonite

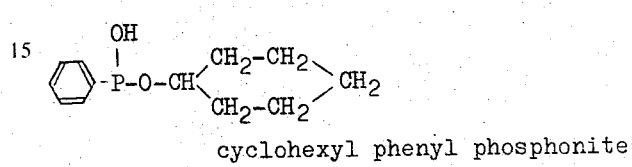

cyclohexyl phenyl phosphonite

Specific methods for blending the polyamides, compounds (I), if necessary, phosphorus compounds with polyesters are explained below.

1. Powdered or chipped polyester, powdered or chipped polyamide compounds (I) and phosphorus compound in a given amount, respectively, are simultaneously mixed and the mixture is transferred to the next step or they are once melt mixed by a screw type extruder and then the mixture is chipped and transferred to the next step.

2. Polyamide, compounds (I) and phosphorus compound are previously well mixed and the mixture is mixed with chipped or powdered polyester and the resultant mixture is transferred to the next step or they are once melt mixed by a screw type extruder and chipped and transferred to the next step.

3. To the melt of polyester at completion of polymerization are added the additives and they are melt mixed and the mixture is chipped and then transferred to the next step as it is.

4. To the melt of polyamide at completion of polymerization are added phosphorus compound and a compound (I) and they are melt mixed. The mixture is cooled and then chipped or powdered. Thereafter, this is mixed with chips or powders of polyester and thus resultant mixture is transferred to the next step as it is or is once melt extruded and chipped and then is transferred to the next step.

5. Polyamide, phosphorus compound and a compound (I) are mixed. Then, the mixture is melt extruded and chipped. The resultant chips are mixed with polyester.

6. Each additive is poured into the path of flowing molten polyester by a screw type extruder or gear pump and then the mixture is shaped as it is or the mixture is once chipped and then transferred to the next step.

In any case, it is necessary to sufficiently dry the mixture or the additives before melt mixing. If they are not dried sufficiently, molecular weight of polyester is conspicuously reduced at melting due to the adsorbed water.

The polyamides used in the present invention are suitably those which contain 1 to 10 percent by weight of nitrogen atom of tertiary amino group in their molecule. When less than 1 percent by weight, it is necessary to mix the polyamide in a large amount with polyester to obtain sufficient dyeability and whiteness and properties of the polyester fibers obtained are extremely lowered. On the other hand, when more than 10 percent by weight, water solubility of the obtained polyamide itself becomes higher and it escapes from polyester fibers in a dyeing bath or coloration of polyamide itself is apt to be caused due to oxidation.

Amount of polyamide added, which has a relation with the amount of the tertiary amine contained in the molecule of polyamide, is 2 to 20 percent by weight. That is, when less than 2 percent by weight, even if a large amount of tertiary amine is contained in the molecule, diffusion of acid dyes in the fibers becomes insufficient and sufficient dyeability cannot be attained since concentration of the polyamide itself in polyester fibers is low. On the other hand, even when the amount of polyamide exceeds 20 percent by weight, dyeability is not further improved and rather, whiteness and properties of the fibers obtained are lowered.

The amount of compound (I) to be mixed is 0.5 to 10 percent by weight of the polyester. When less than 0.5 percent, the effects obtained are small and when more than 10 percent, the properties of the fibers are lowered.

The compound (I) is stable even at a temperature of higher than the melting point of polyester and when mixed with polyester, causes substantially no coloration of the shaped product and reduction of molecular weight of polyester due to thermal decomposition at melt molding of polyester, being different from the known polyalkylene oxide.

Furthermore, when polyamide is melt mixed with polyester or when polyalkylene oxide is jointly used, also undesired coloration of polyester is caused while when the compound (I) and polyamide are jointly mixed with polyester, coloration due to the polyamide can be considerably prevented.

Moreover, fibers obtained by mixing both polyamide and compound (I) with polyester exhibit extremely excellent dyeability with water soluble ionic dyes as compared with polyester fibers obtained by mixing only polyamide with polyester. It is considered that such effect results from the fact that three alkylene oxides are attached to phosphorus atom and hydrophilic alkylene ether groups extend to three directions.

Moreover, addition of the known polyalkylene oxide to polyester generally results in weather resistance and fastness to light of dyed products while the composition of the present invention substantially overcomes said defects. Such effect can also be obtained by mixing only a phosphorus acid triester of ω-alkyl or aryl polyalkylene glycol, but as compared therewith when compound (I) of the present invention is mixed, the condensate oozes out with difficulty from fibers when subjected to heat treatment, dyeing, etc. and the attained effects are very stably maintained.

Furthermore, since the polyamide used in the present invention has a large amount of tertiary amine in the molecule as mentioned before, it becomes liable to be colored when melt mixed with polyester. For prevention of said coloration, phosphorus compounds such as phenylphosphonous acid may be further mixed with compound [I] to obtain filaments of further improved whiteness. Amount of said phosphorus compounds to be added is preferably 0.05 to 2.0 percent by weight of the total compositions. When less than 0.05 percent by weight, substantially no effect is obtained and when more than 2.0 percent by weight, reduction of molecular weight of polyester at melting is accelerated and this is not preferred.

When, for example, fibers are produced from the composition of the present invention, conditions nearly the same as those for production of ordinary polyester fibers may be employed, but since melt viscosity of the melt reduces by the degree corresponding to the amount of the polyamide and the compound [I], it is preferred to choose a spinning temperature lower by 5° to 20°C.

In practice of the present invention, the materials which have conventionally been added to polyester, e.g., pigments such as titanium dioxide, carbon black, etc., fluorescent white dyes, antistatic agents, ultraviolet absorbing agent, etc. may be naturally used.

Especially when fibers are produced from the present composition, 0.05 to 2.0 percent by weight of the final total composition of the following hindered phenol compounds may be added at polymerization of polyamide to be blended or at mixing of each component to further improve heat resistance of the fibers at finishing step. The suitable hindered phenol compounds are as follows:

di-tert-butyl-p-cresol,
2,2-methylene-bis(4-methyl-6-tert-butylphenol),
2,2-thio-bis(4-methyl-6-tert-butylphenol),
tetrabis[3-(4-hydroxy-3,5-di-tert-butylphenyl)-
  propionyl oxymethyl]methane,
2,6-bis(4-hydroxy-3,5-di-tert-butylphenoxy)-6-octyl-
  thio-S-trizine,
1,6-hexamethylene-bis(β-4-hydroxy-3,5-di-tert-
  butylphenylpropion)amide,
4-hydroxy-3,5-di-tert-butylphenylphosphite,
4-hydroxy-3,5-di-tert-butylphenylphosphate,
diethyl-4-hydroxy-3,5-di-tert-butyl-benzyl phosphate.

The fibers obtained from the present composition have excellent dyeability with acid dyes which is nearly the same as that of wool or nylon fibers and moreover have such characteristic that little unlevel dyeing are caused due to change of conditions for production of fibers.

Furthermore, whitness of thus obtained fibers is excellent and nearly the same as that of ordinary polyester fibers. The stability is also excellent and dyed fibers have high brightness.

The present invention will be illustrated in the following Examples.

Each measured value in these Examples was measured as follows:

a. Intrinsic viscosity [$\eta$] of polyester: This was measured in a mixed solvent (1:1 in volumeric ratio) of phenol and tetrachloroethane at 25°C.
b. Relative visocity $\eta_{rel}$ of polyamide: This was measured at polymer concentration of 1 percent by weight in 96 percent aqueous solution of sulfuric acid.
c. Amount of tertiary amino group in polyamide: Polyamide was dissolved in a mixed solvent (1:1 in volumeric ratio) of phenol and ethanol and the amount of tertiary amino group was measured from breaking point in conductometric titration with 0.1 N aqueous solution of hydrochloric acid as distinguished from primary amino group.
d. Melting point of polyamide: This was measured by differential thermal analyzing device at a temperature elevation rate of 10°C/min under nitrogen stream.

e. Whiteness of fibers Y value (percent), PI value (percent): The Y value and PI value were obtained in accordance with ASTM E97-53T and JIS L1013, respectively. The greater Y value indicates that coloration of fibers is in the lower degree and they are whiter and the greater PI value indicates that the fibers have the whiteness close to the whiteness of magnesium oxide used as standard white surface.

f. Depth of color of dyed products Y value (percent): X, Y and Z values of reflection spectrum were measured by a totally automatic spectrophotometer (EPR—2 Type manufactured by Hitachi Seisakusho K.K.) and among them, Y value was expressed by percent. The smaller Y value means that the product was dyed in deep color.

g. Dye exhaustion (percent): This was colorimetrically measured on residual solution by diffraction grating type spectromic (20) manufactured by Shimazu Seisakusho K.K.

h. Fastness to light and washing of the dyed articles:
  1. Measuring method of fastness to light is in accordance with JIS 1044(1959) Fade-O-meter method (corresponding to AATCC, 16A-1964)
  2. Measuring method of fastness to washing is in accordance with JIS-L1045 (1959), BC-2 (corresponding to AATCC, 36-1964)

Example 1

1,000 Grams of N,N'-bis(3-aminopropyl)piperazine was dissolved in 3 l of ethanol and 730 g of adipic acid was dissolved in 10 l of ethanol. The resultant two solutions were mixed to obtain a white powdery salt.

1,000 Grams of said salt was dissolved in 1,000 ml of water. The solution was heated in a flask while stirring by elevating the temperature to 200°C in 2 hours with distillation of water and heated for additional 1 hour to complete reaction to obtain a white polymer having a relative viscosity $\eta_{rel}$ of 2.50. This polymer had a softening point of about 170°C and a melting point of 202°C. It was confirmed by analysis that said polymer contained $0.640 \times 10^{-2}$ eq/g of tertiary amino group and 8.96 percent by weight of nitrogen atom of the tertiary amino group.

The compound

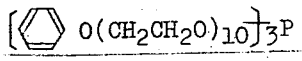

was synthesized from triphenyl phosphite and

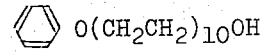

obtained by reacting ethylene oxide with phenol. Furthermore, said product was reacted with formaldehyde to obtain the following polycondensate (compound A), which was adjusted.

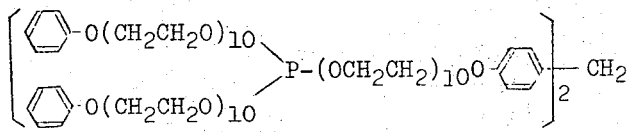

Three parts of powders of said polyamide, 0.1 part of phenyl phosphonous acid (PPA) and 3 parts of the compound A were well mixed. The resultant mixture was further mixed with 94 parts of powders of polyethylene terephthalate having an intrinsic viscosity of 0.72 obtained with use of manganese acetate as an esterinterchange catalyst and germanium dioxide as a polymerization catalyst in a V type blender for 15 minutes.

The resultant mixture was dried in vacuo at 130°C for 6 hours and then was melt kneaded at 275°C with a screw type extruder and then was chipped. The chips were dried in vacuo at 130°C for 6 hours and immediately fed to a hopper of a spinning machine under nitrogen gas and spun at 275°C.

The spinning conditions were as follows: out put: 35 g/min, number of nozzle holes: 36 and take up speed: 1,250 m/min. Intrinsic viscosity of thus obtained filaments which were not yet treated with spinning oil was 0.675.

The resultant undrawn filaments were drawn to 3.3 times the original length at 600 m/min. under the conditions of hot pin at 90°C and hot plate at 160°C to obtain filaments of 75 d/36 f (Sample A).

The above procedure was repeated except that no phenyl phosphonous acid was added, except that only polyamide and phenyl phosphonous acid were added and the compound A was not added, and except that polyamide and 3 parts of polyethylene oxide (PEG) having a molecular weight of about 3,000 to obtain Sample B, Sample C and Sample D, respectively. Whiteness of the filaments and heat treated filaments (at 130°C for 30 minutes in air), dye exhaustion when they were dyed with a dyeing bath comprising 5 percent owf of an acid dye (CI 14680) and 3 percent owf of acetic acid and having fiber to liquor ratio of 1:50 at 100°C for 60 minutes and then they were souped in a bath of soda ash (1 g/l) and a nonylphenol ethylene oxide (1 g/l) at 85°C for 15 minutes and then they were rinsed in water, fastnesses of light and washing of thus dyed filaments are shown in Table 1.

Table 1

| Sample | Additives (% by weight) | | Heat treatment 130°C 30 min | Whiteness Y value (%) | PI value (%) | Dye exhaustion (%) | Fastness to light (grade) | Fastness to washing (grade) |
|---|---|---|---|---|---|---|---|---|
| A | Polyamide | 3 | Not carried out | 85.0 | 97.5 | 78 | 5 | 5 |
|   | PPA | 0.1 |   |   |   |   |   |   |
|   | Compound A | 3 | Carried out | 80.2 | 97.0 | 82 | 5 | 5 |
| B | Polyamide | 3 | Not carried out | 82.5 | 95.9 | 77 | 5 | 5 |
|   | Compound A | 3 | Carried out | 79.7 | 94.5 | 83 | 5 | 5 |
| C | Polyamide | 3 | Not carried out | 84.5 | 93.0 | 15 | 1 | 4 |
|   | PPA | 0.1 | Carried out | 80.5 | 87.0 | 72 | 3 - 4 | 3 |
| D | Polyamide | 3 | Not carried out | 75.2 | 87.0 | 45 | 3 | 5 |
|   | PEG | 3 | Carried out | 71.1 | 84.0 | 80 | 4 | 4 |

From the above results, it will be recognized that with Samples A and B which are according to the present invention, the whiteness was excellent, reduction of the whiteness due to heat treatment were relatively small and excellent dyeability was attained without heat treatment.

Example 2

To 3 parts of polyamide, 0.1 part of phenyl phosphonous acid, 3 parts of the compound A and 94 parts of polyethylene terephthalate which were used in Example 1 was further added 0.5 part of 1,6-hexamethylene bis(4-hydroxy-3,5-di-tert-butylphenylpropion amide) and fibers (Sample E) were obtained therefrom in the same manner as in Example 1.

Samples A, B, C and D obtained in EXample 1 and Sample E were heat treated in hot air at 180°C for 2 minutes and whiteness (Y value percent) thereof was measured to obtain the results as shown in Table 2.

Table 2

| Sample Treatment | A | B | C | D | E |
|---|---|---|---|---|---|
| Before heat treatment | 85.0 | 8.25 | 84.5 | 75.2 | 84.2 |
| After heat treatment | 79.5 | 78.2 | 78.5 | 70.2 | 84.0 |

The above results show that especially Sample E had excellent whiteness-retainability at a high temperature.

Example 3

One mole of formaldehyde and 2 moles of 3,5-distylenyl phenol obtained by reacting 1 mole of phenol and 2 moles os styrene were reacted to obtain 2,2-methylene bis(4-hydroxy-3,5-distylenyl benzene), to which ethylene oxide was reacted to obtain 2,2-methylene bis(4-polyoxyethylene-3,5-distylene benzene). Amount of ethylene oxide reacted was about 14 moles. One mole of thus obtained compound and 4 moles of a compound obtained by reacting 14 moles of ethylene oxide with p-nonylphenol were reacted with 2 moles of triphenyl phosphite to remove phenol produced to obtain compound B having the following formula:

4.5 percent by weight of polyamide comprising N,N'-bis(3-aminopropyl)piperazine and adipic acid, 0.2 percent by weight of phenylphosphonous acid and 0, 0.5, 1.0, 2.0 and 3.0 percent by weight of compound B were blended with polyethylene terephthalate having an intrinsic viscosity of 0.70. Each of thus obtained fine compositions was spun under the following conditions: temperature ... 270°C; output ... 60 g/min.; number of nozzle hole ... 30; and take up speed ... 1,000 m/min. Each of thus obtained undrawn filaments was drawn to 3.3 times the original length with pin at 90°C and plate at 160°C to obtain filaments of 150 d/30 f. Each filament was dyed with acid dye (CI 17045) at dyeing concentration of 0.5, 1.0, 2.0 and 5.0 percent owf. The dyeing was carried out with use of 3 percent owf of acetic acid at 100°C for 60 minutes. The dye exhaustions of each fibers are shown in Table 3.

Table 3

| | Compositions | | | Dye exhaustion (%) | | | |
|---|---|---|---|---|---|---|---|
| Sample No. | Polyamide (% by weight) | Phenylphosphonous acid (% by weight) | Compound B (% by weight) | 0.5 % owf | 1.0 % owf | 2.0 % owf | 5.0% owf |
| F | 4.5 | 0.2 | 0 | 96 | 81 | 49 | 23 |
| G | 4.5 | 0.2 | 0.5 | 98 | 99 | 50 | 32 |
| H | 4.5 | 0.2 | 1.0 | 100 | 100 | 99 | 58 |
| I | 4.5 | 0.2 | 2.0 | 100 | 100 | 99 | 82 |
| J | 4.5 | 0.2 | 3.0 | 100 | 100 | 99 | 83 |

When cross-section of each dyed fiber was examined with a microscope, it was found that fibers of Sample No. F were dyed in only the circumference part thereof while those of Sample No. G, H, I and J were substantially or completely uniformly dyed up to the central portion of cross-section.

As is clear from the above results. Samples No. G, H, I and J according to the present invention had excellent properties as compared with the comparative Sample No. F.

Example 4

This example shows that unlevel dyeing due to change of conditions for production of fibers hardly occur when the fibers obtained from the present composition are dyed with an acid dye.

Undrawn filaments of Samples No. F, H, I and J obtained in Example 3 were drawn with a pin at 90°C and hot plates at 140°C, 160°C and 180°C to obtain fibers of 150 d/30f. The fibers obtained from each sample were knitted into a tube, which was dyed with an acid dye (C.I. 17045) at 1 percent owf in the same manner as in Example 3. Depth of color of thus dyed articles was measured with a spectrophotometer (Y value percent) and the results are shown in Table 4.

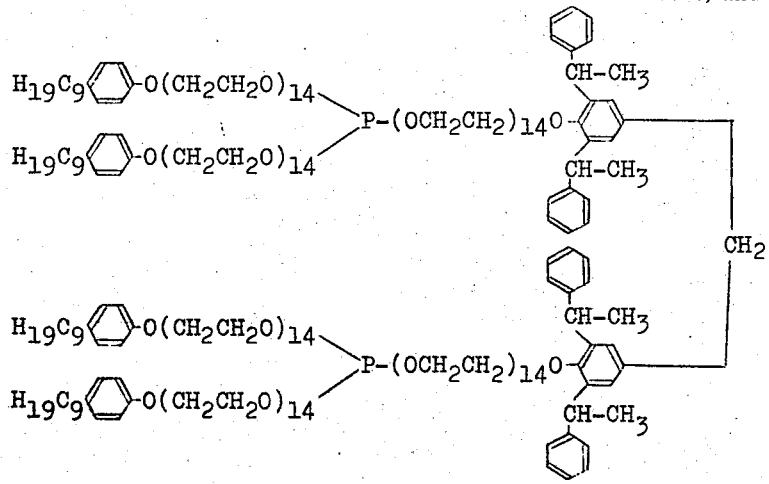

Table 4

| Sample No. | Compositions | | | Temperature of hot plate (°C) | | |
| --- | --- | --- | --- | --- | --- | --- |
| | Polyamide (% by weight) | Phenylphosphonous acid (% by weight) | Compound B (% by weight) | 140 | 160 | 180 |
| F | 4.5 | 0.2 | 0   | 35 % | 23 % | 16 % |
| H | 4.5 | 0.2 | 1.0 | 22 % | 16 % | 11 % |
| I | 4.5 | 0.2 | 2.0 | 16 % | 13 % | 12 % |
| J | 4.5 | 0.2 | 3.0 | 15 % | 15 % | 13 % |

Y value of Sample No. F which was a comparative example greatly changed from 35 percent (extremely light shade) at 140°C (hot plate) to 16 percent (medium shade) at 180°C (hot plate). On the other hand, Y value of Samples No. H, I and J which were obtained from the present compositions hardly changed even when temperature of hot plate was changed and this means that unlevel dyeing hardly occurred due to change of conditions for production of fibers.

Example 5

129 Grams of N-2-aminoethylpiperazine, 166 g of terephtalic acid, 339 g of ε-caprolactam and 1 l of water were changed in a reactor and were heated to 150°C in 1 hour while stirring, further were reacted at 200°C for 3 hours and thereafter were further reacted at 250°C for 1 hour to obtain a yellow polymer. The amount of nitrogen atom of tertiary amino group in said polymer was 2.4 percent by weight. 100 Grams of this polyamide, 4g of Na salt of phenylphosphonous acid and 20 g of

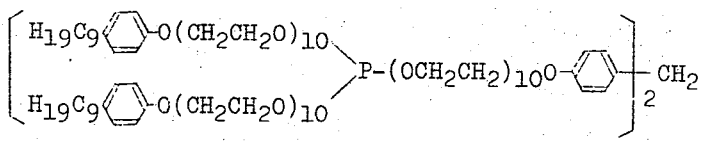

(compound C) were well mixed and then were further mixed with 880 g of powders of polyethylene terephthalate having an intrinsic viscosity of 0.700. The mixture was dried in vacuo 6 hours at 120°C and then was made into chips with a screw type extruder. The resultant chips were dried in vacuo at 120°C for 6 hours and immediately transferred to a spinning machine under nitrogen gas and spun and drawn in the same manner as in Example 1 to obtain fibers of 75 d/36 f. The resultant fibers had an intrinsic viscosity of 0.612, a strength of 4.05 g/d, an elongation of 20.5 percent and a whiteness of 95.5 percent in PI value.

Said fibers were dyed in the same manner as in Example 1 to attain a dye exhaustion of 65 percent and to obtain bright red color.

Example 6

3.5 percent by weight, 4.0 percent by weight and 4.5 percent by weight of polyamide obtained from N,N'-bis(3-aminopropyl)piperazine and adipic acid, 0.2 percent by weight of phenylphosphonous acid and 0 percent by weight and 3 percent by weight of condensate (compound D) of

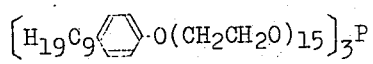

and formaldehyde were blended with polyethylene terephthalate having an intrinsic viscosity of 0.72 and fibers having compositions as enumerated in Table 5 were produced in the same manner as in Example 1.

The fibers were dyed in the same manner as in Example 1. The results are shown in Table 5.

Table 5

| Sample No. | Compositions | | | Shade of the dyed fibers |
| --- | --- | --- | --- | --- |
| | Polyamide (% by weight) | Phenylphosphonous acid (% by weight) | Compound D (% by weight) | |
| K | 3.5 | 0.2 | 0 | The fibers hardly dyed. |
| L | 3.5 | 0.2 | 3 | Medium shade |
| M | 4.0 | 0.2 | 0 | Light shade |
| N | 4.0 | 0.2 | 3 | Deep shade |
| O | 4.5 | 0.2 | 0 | Medium shade |
| P | 4.5 | 0.2 | 3 | Deep shade |

From the above results, it is clear that Samples L, N and P which were obtained from the present compositions exhibited excellent dyeability even with addition of a small amount of the polyamide.

What is claimed is:

1. In a polyester composition containing a linear fiberforming polyester and a polyamide having repeating CONH groups as in integral part of the polymeric chain and containing 1 to 10 percent by weight of nitrogen atom of tertiary amino nitrogen in the polyamide molecule, the improvement being that said composition contains additionally a compound (I) of the general formula:

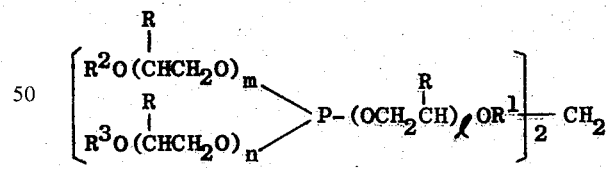

(wherein R is hydrogen or methyl, $R^1$ is phenylene having or not having hydrocarbon radical substituents, $R^2$ and $R^3$ are at least one group selected from aryl and aralkyl groups having or not having a substituent and an alkyl group of $C_1$ to $C_{18}$ and $l$, $m$ and $n$ are integers of 1 to 200), the ratio of said linear polyester, polyamide and compound (I) being 70 – 97.5 percent : 2 – 20 percent : 0.5 – 10 percent by weight.

2. A polyester composition according to claim 1, wherein said linear polyester is selected from polyethylene terephthalate, polytetramethylene terephthalate, poly-1,4-cyclohexane terephthalate and copolymers thereof.

3. A polyester composition according to claim 1, wherein said polyamide is obtained by reacting a tertiary amine-containing compound selected from the compounds represented by the general formulas:

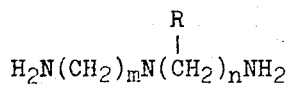

(wherein R is an alkyl group, $m$ and $n$ are intergers of at least 1)

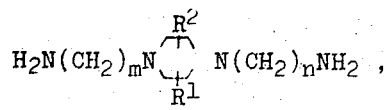

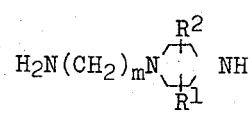

(wherein $R^1$ and $R^2$ are hydrogen or alkyl and $m$ and $n$ are as previously defined)

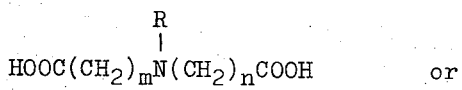    or

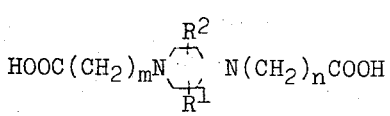

(wherein R, $R^1$, $R^2$, $m$ and $n$ are as previously defined) with at least one of aliphatic dicarboxylic acids, aromatic dicarboxylic acids, aliphatic diamines, aromatic diamines, lactam and aminocarboxylic acids in such a manner that primary and/or secondary amines are equivalent with acid groups of the dicarboxylic acid.

4. A polyester composition according to claim 3, wherein said polyamide is obtained from at least one selected from N,N-bis(3-aminopropyl)methylamine, N,N'-bis(2-aminoethyl)piperazine, N,N'-bis(3-aminopropyl)-piperazine, N-2-aminoethylpiperazine, N,N'-bis(3-aminoethyl)-2-methyl piperazine, N,N'-bis(3-aminopropyl)-2,5-dimethylpiperazine, N,N-bis(2-carboxyethyl)methylamine and N,N'-bis(2-carboxyethyl)piperazine and at least one selected from adipic acid, sebacic acid, isophthalic acid, terephthalic acid, tetramethylenediamine, hexamethylene diamine, metaphenylenediamine, metaxylylenediamine, ε-caprolactam and aminocaproic acid.

5. A polyester composition according to claim 1, wherein said polyamide is obtained from at least one selected from N,N-bis(3-aminopropyl)methylamine, N,N'-bis(2-aminoethyl)piperazine, N,N'-bis(3-aminopropyl) piperazine, N-2-aminoethylpiperazine, N,N'-bis(3-aminoethyl)-2-methylpiperazine, N,N'-bis(3-aminopropyl)-2,5-dimethylpiperazine, N,N-bis(2-carboxyethyl)methylamine and N,N'-bis(2-carboxyethyl)-piperazine and at least one selected from adipic acid; sebacic acid, isophthalic acid, terephthalic acid, tetramethylenediamine, hexamethylenediamine, metaphenylenediamine, metaxylylenediamine, ε-caprolactam and aminocaproic acid.

6. A polyester composition according to claim 1, wherein said polyamide comprises N-2-aminoethylpiperazine/adipic acid (50/50 in molar ratio), N,N'-bis(3-aminopropyl)piperazine/adipic acid (50/50 in molar ratio), N,N-bis(3-aminopropyl)methylamine-sebacic acid (50/50 in molar ratio), N,N'-bis(2-carboxyethyl)piperazine/hexamethylenediamine (50/50 in molar ratio), N,N'-bis(3-aminopropyl)piperazine/adipic acid/isophthalic acid (50/25/25 in molar ratio), N,N'-bis(2-aminoethyl)-piperazine/hexamethylene diamine/adipic acid (25/25/50 in molar ratio) and N-2-aminoethylpiperazine/tere-phthalic acid/ε-caprolactam (20/20/60 in molar ratio).

7. A polyester composition according to claim 3, wherein said polyamide comprises N-2-aminoethylpiperazine/adipic acid (50/50 in molar ratio), N,N'-bis(3-aminopropyl)piperazine/adipic acid (50/50 in molar ratio), N,N-bis(3-aminopropyl)methylamine/-sebacic acid (50/50 in molar ratio), N,N'-bis(2-carboxyethyl)piperazine/hexamethylenediamine (50/50 in molar ratio) N,N'-bis(3-aminopropyl)piperazine/adipipc acid/isophthalic acid (50/25/25 in molar ratio), N,N'-bis(2-aminoethyl)piperazine/hexamethylenediamine/adipic acid (25/25/50 in molar ratio) and N-2-amino-ethylpiperazine/terephthalic acid/ ε-caprolactam (20/20/60 in molar ratio).

8. A polyester composition according to claim 1, wherein the compound (I) is represented by the general formula:

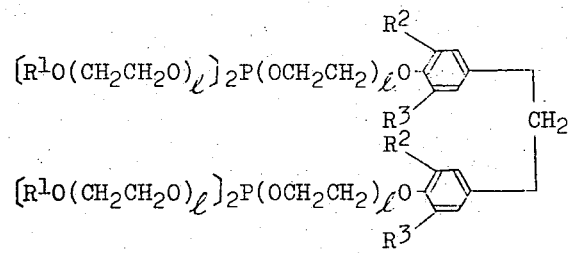

(wherein $R^1$ is at least one group selected from an alkyl group of $C_1$ to $C_{18}$, an aryl group and an aralkyl group, $R^2$ and $R^3$ are at least one group selected from hydrogen, an alkyl, aryl, aralkyl and alkenyl groups and $l$ is an integer of 5 to 50).

9. A polyester composition according to claim 1, wherein the compound (I) is

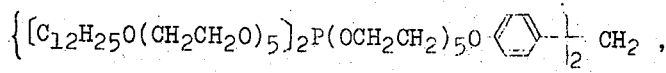

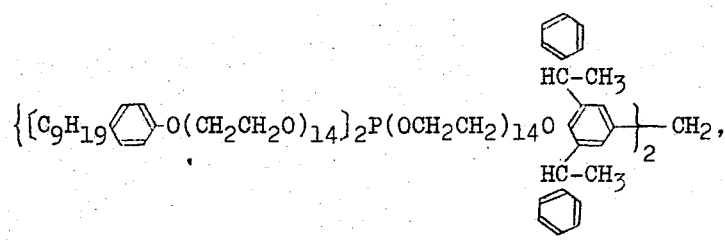

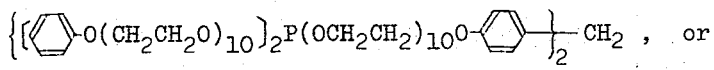, or

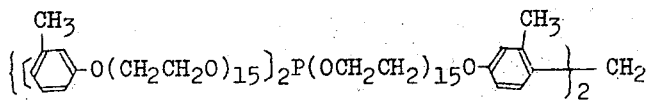

10. A polyester composition according to claim 6, wherein the compound (I) is

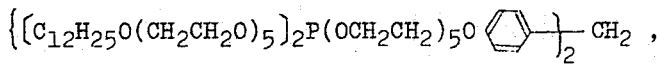

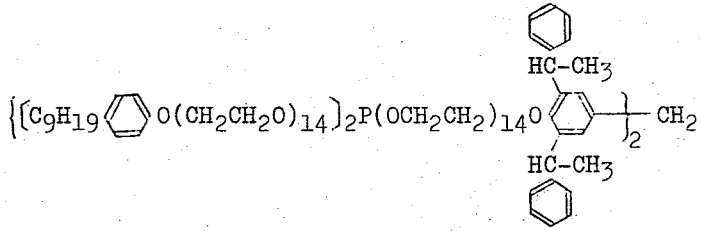

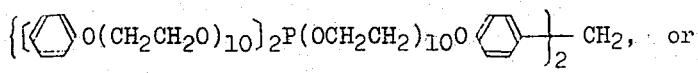, or

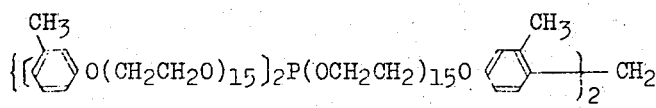

11. A polyester composition according to claim 1, wherein the compound (I) is

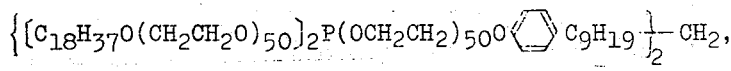

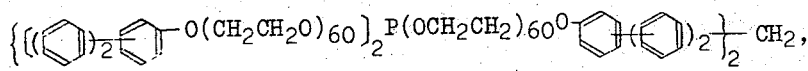

or 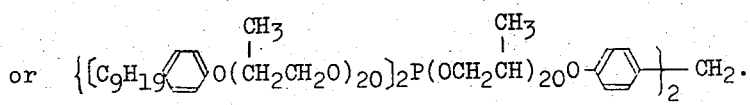

12. A polyester composition according to claim 1, wherein it additionally contains 0.05 to 2.0 percent by weight of the composition of a phosphorus compound represented by the general formula:

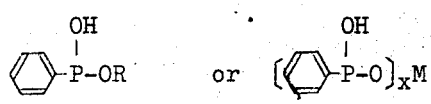

(wherein R is selected from hydrogen, alkyl group, cycloalkyl group, aryl group and alkylaryl group, M is a metal atom and $x$ is an integer corresponding to valence of M).

13. A polyester composition according to claim 12, wherein said phosphorus compound is selected from phenyl phosphonous acid, sodium phenyl phosphonite, potassium phenyl phosphonite, manganese phenyl phosphonite, calcium phenyl phosphonite, ethyl phenyl phosphonite and cyclohexyl phenyl phosphonite.

14. A polyester composition according to claim 1, wherein it contains 0.05 to 2.0 percent by weight of the composition of a hindered phenol compound.

15. A polyester composition according to claim 14, wherein said hindered phenol compound is selected from di-tert-butyl-p-cresol, 2,2-methylene-bis(4-methyl-6-tert-butylphenol), tetrabis[3-(4-hydroxy-3,5-di-tert-butylphenol)propionyl oxymethyl] methane, 2,-6-bis(2-hydroxy-5-methyl-3-tert-butylbenzyl)-4-methyl phenol, 2,4-bis(4-hydroxy-3,5-di-tert-butylphenoxy)-6 -octylthio-S-triazine 1,6-hexamethylene-bis($\beta$-4-hydroxy-3,5-di-tert-butylphenylpropion)amide, 4-hydroxy-3,5-di-tert-butyl phenyl phosphite, 4-hydroxy-3,5-di-tert-butyl phenyl phosphate and diethyl-4-hydroxy-3,5-di-tert-butyl benzyl phosphonate.

16. A polyester composition according to claim 1 wherein it comprises 70 to 97.5 percent by weight of polyethylene terephthalate, 2 to 20 percent by weight of polyamide comprising N,N'-bis(3-aminopropyl)piperazine and adipic acid and 0.5 to 10 percent by weight of

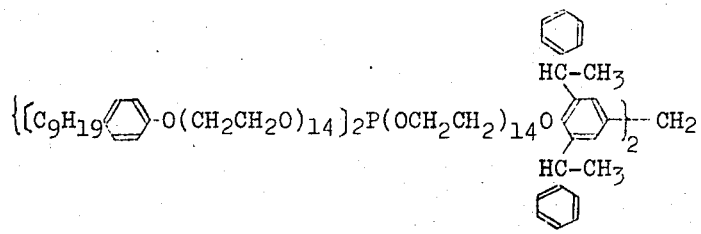
17. A polyester composition according to claim 16, wherein it contains 0.05 to 2.0 percent by weight of the total composition of phenyl phosphonous acid.
18. Polyester fibers obtained from the composition of claim 1.
* * * * *